(12) United States Patent
Saitoh (10) Patent No.: US 6,178,434 B1
(45) Date of Patent: Jan. 23, 2001

(54) ANCHOR BASED AUTOMATIC LINK GENERATOR FOR TEXT IMAGE CONTAINING FIGURES

(75) Inventor: Takashi Saitoh, Kanagawa (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/023,274

(22) Filed: Feb. 13, 1998

(30) Foreign Application Priority Data

Feb. 13, 1997 (JP) .................................... 9-028955

(51) Int. Cl.[7] .................................................. G06F 17/30
(52) U.S. Cl. ........................ 707/513; 707/500; 707/501; 707/517
(58) Field of Search .................................. 707/513, 500, 707/517, 520, 501; 382/113, 171, 173, 175, 176, 282

(56) References Cited

U.S. PATENT DOCUMENTS

| | | | |
|---|---|---|---|
| 4,723,211 | * | 2/1988 | Barker et al. .......................... 707/514 |
| 5,555,362 | * | 9/1996 | Yamashita et al. ................... 707/517 |
| 5,659,639 | * | 8/1997 | Mahoney et al. ..................... 382/309 |
| 5,689,585 | * | 11/1997 | Bloomberg et al. ................. 382/229 |
| 5,745,360 | * | 4/1998 | Leone et al. .......................... 707/513 |
| 5,761,683 | * | 6/1998 | Logan et al. .......................... 707/513 |
| 5,809,317 | * | 9/1998 | Kogan et al. ......................... 707/501 |
| 5,815,830 | * | 9/1998 | Anthony ................................ 707/6 |
| 5,848,184 | * | 12/1998 | Taylor ................................... 382/173 |
| 5,893,127 | * | 4/1999 | Tyan et al. ............................ 707/513 |

FOREIGN PATENT DOCUMENTS 7-98708  4/1995 (JP) .

OTHER PUBLICATIONS

An Investigation of Automatic HTML Coding Method for Images, Fujii et al., Technical Report of IEICE OFS 95–23, IE 95–55 (1995) (Abstract).

Generating Hyper Text From Printed Text for Electronic Library, Image recognition and understanding Symposiun (MIRU) Ohira et al. (1996).

A Method of Logical Structuring of Printing Documents with High Applicability, Koyama et al.. College of Engineering, University of Osaka Prefecture (1995).

* cited by examiner

Primary Examiner—John Breene
Assistant Examiner—Greta L. Robinson
(74) Attorney, Agent, or Firm—Knoble & Yoshida, LLC (57) ABSTRACT

An anchor-based automatic link generator generates a link between elements in a text image. An anchor specifies an element to be linked and includes at least a key portion for specifying a type of an element and a reference portion for specifying a reference number of the specified type. Such links associate a legend for a figure with a corresponding main text as well as a figure with a corresponding text and or a legend even if there is no legend associated with a figure.

11 Claims, 9 Drawing Sheets

ANCHOR BASED AUTOMATIC LINK GENERATOR FOR TEXT IMAGE CONTAINING FIGURES

FIELD OF THE INVENTION

The current invention is generally related to a method and a system for generating a link for hypertext, and more particularly related to a method and a system for automatically generating a link between a legend for a figure and a corresponding main text and or a link between a figure and a corresponding text and or a legend.

BACKGROUND OF THE INVENTION

In the area of text image processing, there have been attempts for structuring components of textual information. One example of such a process is that a certain portion of text is made associated with another part of the text so that a reader can select relevant information based upon the textual association. Such text with internal associations is called hypertext. To accomplish such associations or links, certain languages such Hyper Text Markup Language (HTML) have been implemented.

Based upon the above described hypertext concept, one prior art attempt such as Japanese Patent Publication Hei 7-98708 discloses a system which selects relevant information from original text according to a reader's characteristics. For example, if the reader holds a certain position in a company, a predetermined type of information is available to him or her. By the same token, depending upon age and sex of a reader, certain predetermined information is displayed.

Another prior art attempt discloses a method of generating a HTML-based data. To generate the HTML data, text is scanned in as textual image, and based upon certain predetermined characteristics of the textual image, a certain portion of the text is associated with another portion of the text. "A Method of Automatically Generating HTML Based upon Image," Fujii et al. Technical Report, Academy of Electronic and Communication, OSF 95-23, IE 95-55 (1995).

Lastly, a third and fourth prior attempts disclose similar methods of generating a HTML-based link between a figure and a corresponding portion of text. To establish a link, the text image is first tentatively divided into text segments and figure segments based upon relative positions within each column of the text image. Within a figure segment, a caption area is determined, and its characters are recognized. A certain predetermined set of characters such as "FIG. 1" is detected in the recognized character data and is used as a label for the figure. Then, the label is further searched in the text segments, and the corresponding text portion is linked to the figure. "Generating Hyper Text From Printed Text for Electronic Library," Image Recognition and Understanding Symposium (MIRU), Ohira et al., (1996); "A Highly Applicable Method of Structuring Printed Text," Koyama et al., Proceeding at Academy of Electronics Information and Communication, (1995).

The above described prior attempts generally fail to disclose a flexible automatic link generation method for text containing figures such as diagrams, tables, equations, drawings and etc. Although the above described third and fourth prior art attempts disclose a link generation between a figure and a corresponding portion of text, the link generation method requires a corresponding legend or caption area and relies upon predetermined labels or a set of characters. These requirements are not necessarily met for every text image.

SUMMARY OF THE INVENTION

In order to solve the above and other problems, according to a first aspect of the current invention, a method of generating a link for indicating a relationship in an image, includes the steps of: a) inputting the image containing segments, each of the segments containing elements; b) analyzing the image so as to generate layout analysis data for representing the elements in each of the segments; c) selecting an anchor which specifies at least one of the elements that is common among the segments; and d) generating a link between at least two of the segments based upon the anchor and the layout analysis data.

According to a second aspect of the current invention, a method of generating a link in an image, includes the steps of: a) inputting the image containing segments; b) dividing the image into segments, the segments containing a figure portion and a text portion, the figure portion and the text portion further containing a reference area; c) determining the reference area among the segments; d) recognizing characters in the image including the reference area; and e) generating a link between the reference area and a corresponding one of the text portion based upon the characters.

According to a third aspect of the current invention, a system for generating a link for indicating a relationship in an image, includes: an image inputting unit for inputting the image containing segments, each of the segments including elements; a layout analysis unit connected to the image inputting unit for analyzing the image so as to generate layout analysis data for representing the elements in each of the segments; an anchor processing unit connected to the layout analysis unit for selecting an anchor which specifies at least one of the elements that is common among the segments; and a link generation unit connected to the anchor processing unit for generating a link between at least two of the segments based upon the anchor and the layout analysis data.

According to a fourth aspect of the current invention, a system for generating a link in an image between a figure portion and a corresponding text portion, includes: an inputting unit for inputting the image; a segmentation unit connected to the inputting unit for dividing the image into segments, the segments containing a figure portion and a text portion, the figure portion and the text portion further containing a reference area; a reference area determination unit connected to the segmentation unit for determining the reference area among the segments; a character recognition unit connected to the inputting unit for recognizing characters in the image including the reference area; and a link generation unit connected to the reference area determination unit and the character recognition unit for generating a link between the reference area and a corresponding one of the text portion based upon the characters.

DETAILED DESCRIPTION OF THE PREFERRED EMBODIMENT(S)

Figure 1:
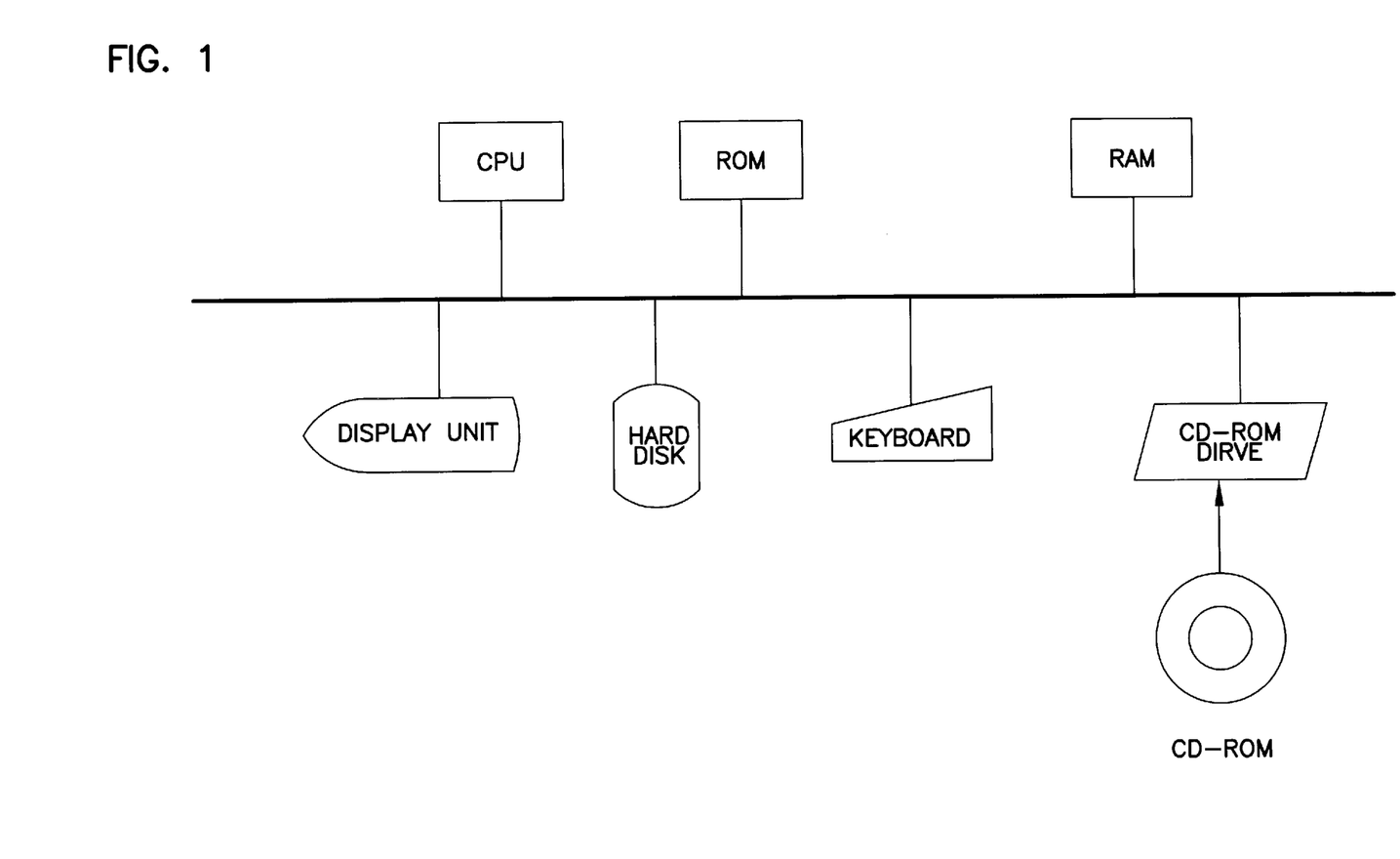
FIG. 1 is a diagram illustrating a computer system in which one preferred embodiment of the anchor-based automatic link generator according to the current invention is implemented as a software program.

Referring now to the drawings, wherein like reference numerals designate corresponding structure throughout the views, and referring in particular to FIG. 1, one preferred embodiment of the reference-based automatic link generation system according to the current invention is implemented in a general computer system. The computer system includes a central processing unit (CPU), a read-only memory unit (ROM), a random access memory unit (RAM), a display unit, a storage unit such as a hard disk and a CD-ROM and an input unit such as a keyboard. According to one preferred embodiment, a substantial portion of the link generator is implemented in a software program which runs on the CPU and the memory unit.

Figure 2:
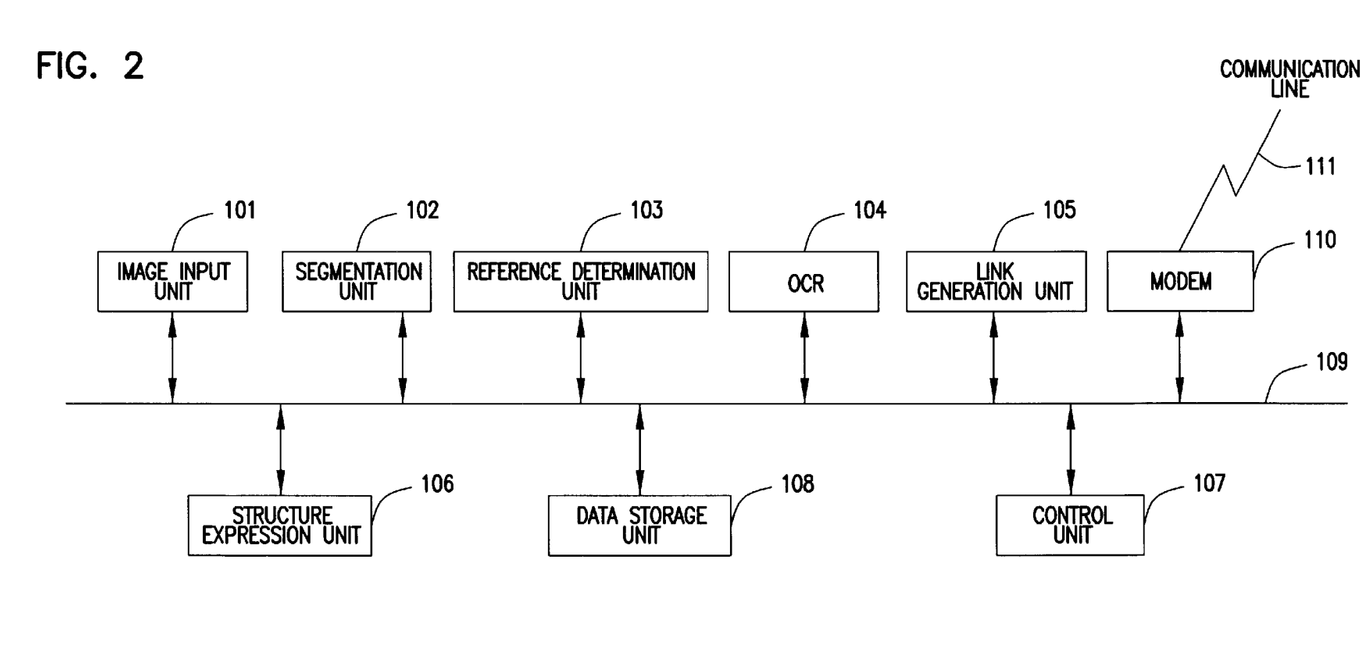
FIG. 2 is a diagram illustrating a second preferred embodiment of the anchor-based automatic link generator according to the current invention.

Referring to FIG. 2, a second preferred embodiment of the reference-based automatic link generation system according to the current invention includes an image input unit 101, a layout analysis unit or a segmentation unit 102, a reference determination unit 103, an optical character recognition unit (OCR) 104, a link generator or link generation unit 105, a structure expression unit 106, a control unit 107, a data storage unit 108, a bus line 109 and a modem 110. The segmentation unit 102 divides the input image into segments. The segments further contain a figure portion and a text portion. The figure portion contains non-textual images such as a graph, a diagram, a table and etc. On the other hand, the text portion generally contains only character image. The reference determination unit 103 detects a reference area in the segments. The reference area indicates a reference to a figure portion. For example, a text portion contains a reference area which includes a reference such as "FIG. 1" to refers to a figure portion that contains the figure image. Another example is that a figure portion includes a reference area such as a legend which references the figure itself in the figure portion. The OCR unit 104 converts the above described textual images into character data so that the link generation unit 105 determines a desired link between segments or between a reference area and a corresponding text portion based upon the character data. The control unit 107 controls the above described units, and the bus line 109 connects these units.

Still referring to FIG. 2, the rest of the second preferred embodiment of the link generation system according to the current invention includes input and output units. The image input unit 101 inputs a text image into the automatic link generation system. The data storage unit 108 stores the image data and other data. The structure expression unit 106 expresses the structural or link relationships among the segments, portions and areas using a predetermined expression such as HTML. In addition to the image input unit 101, input image data is alternatively inputted into the system via the modem 110 as well as the communication line 111. The output data or results such as the HTML data is also outputted via the modem 110 and the communication line 111. The second preferred embodiment also includes certain software programs.

Figure 3:
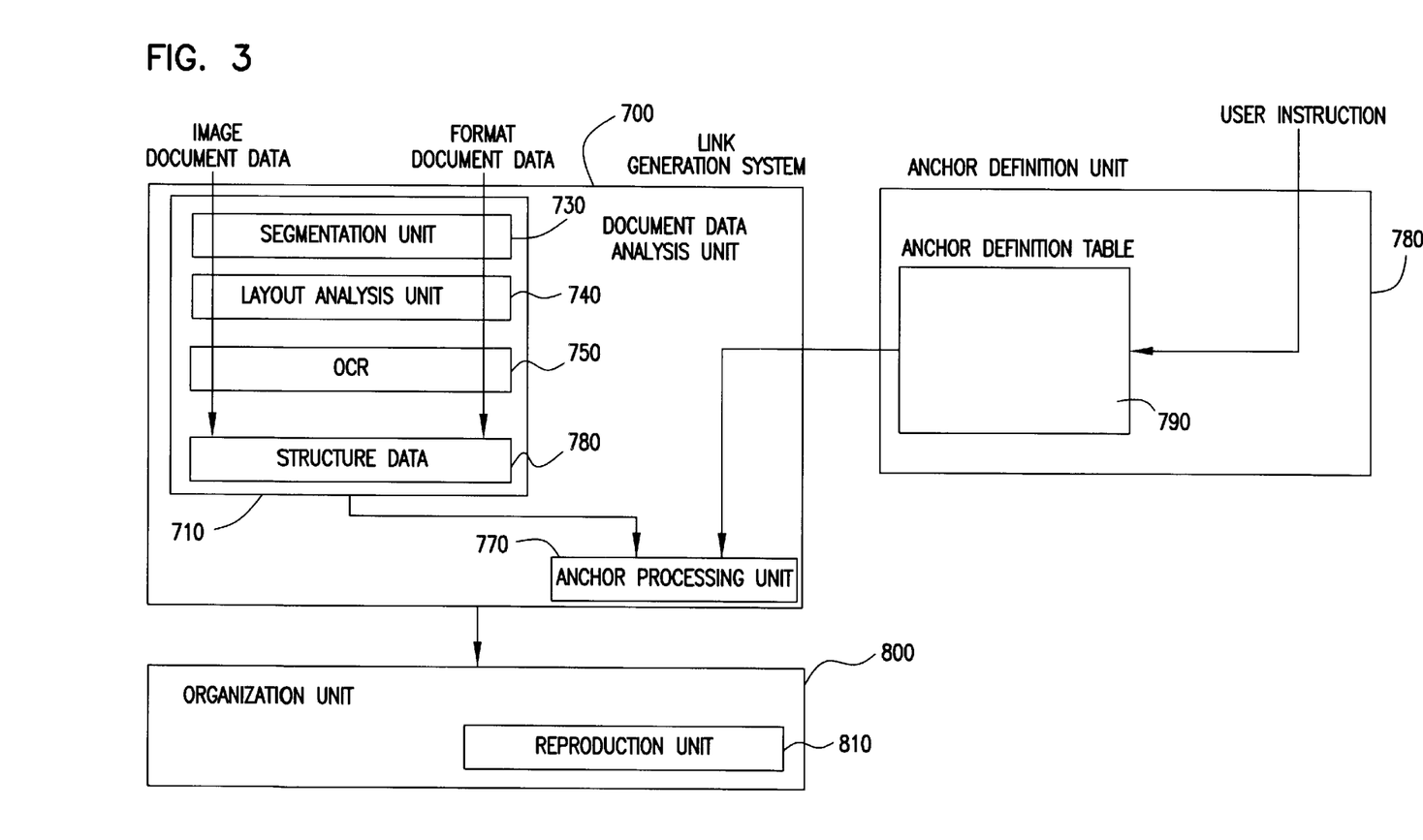
FIG. 3 is a diagram illustrating a third preferred embodiment of the anchor-based automatic link generator according to the current invention.

Now referring to FIG. 3, a third preferred embodiment of the link generation system according to the current invention generally includes a document data analysis unit 710, an anchor processing unit 770, an anchor definition unit 780 and an organization unit 800. The document data analysis unit 710 further includes a segmentation unit 730, a layout analysis unit 740, an optical character recognition (OCR) unit 750 and a structure data unit 760. Either textual image data or formatted document data is inputted into the segmentation unit 730, and the segmentation unit 730 determines segments in the inputted document. The segmentation unit 730 determines segments in the textual image data based upon a predetermined set of criteria such as a size and a relative location of circumscribing rectangles. The segmentation unit 730 also determines segments in the formatted document data based upon the preprocessed data indicating segment boundaries. The layout analysis unit 740 analyzes the segments which contains elements and generates layout analysis data which represents elements in each of the segments. The layout analysis data includes information specifying a type of an element such as text, table, figure and etc. as well as a relative location of the element such as above, below and etc. Based upon the layout analysis data, the OCR unit converts certain textual image into character data. The structure data unit 760 incorporates the character data in the layout analysis data and then feeds the revised layout analysis data into the anchor processing unit 770. The anchor definition unit 780 further includes an anchor definition table 790 which contains user-defined information for specifying a common element among the segments. Based upon the information in the anchor definition table and the layout analysis data, the anchor processing unit 770 determines a link between certain elements.

Still referring to FIG. 3, the above described elements include figure portions including an image of a diagram, a table and an associated legend as well as text portions generally including only textual image. Some of these elements such as a diagram and its associated legend have a common reference such as "FIG. 1." The anchor processing unit 770 finds a common reference specified in a selected anchor among the elements and generates a link between the elements. These links are between a text element and a figure element, between figure elements or between text elements. After the links are generated, an organization unit 800 generates another set of link data such as HTML-based data for representing the links in an efficient manner. The organization unit 800 further includes a reproduction unit 810 which reproduces the original textual image based upon the link data. In reproducing the original textual image, if the format or relative position of certain elements change, a corresponding textual image is accordingly modified. For example, if the original reference to a figure is "the above figure" in the text, and the figure is moved below the text for displaying, the reproduction unit 810 alters the text to "the following figure" for the same link.

Figure 4:
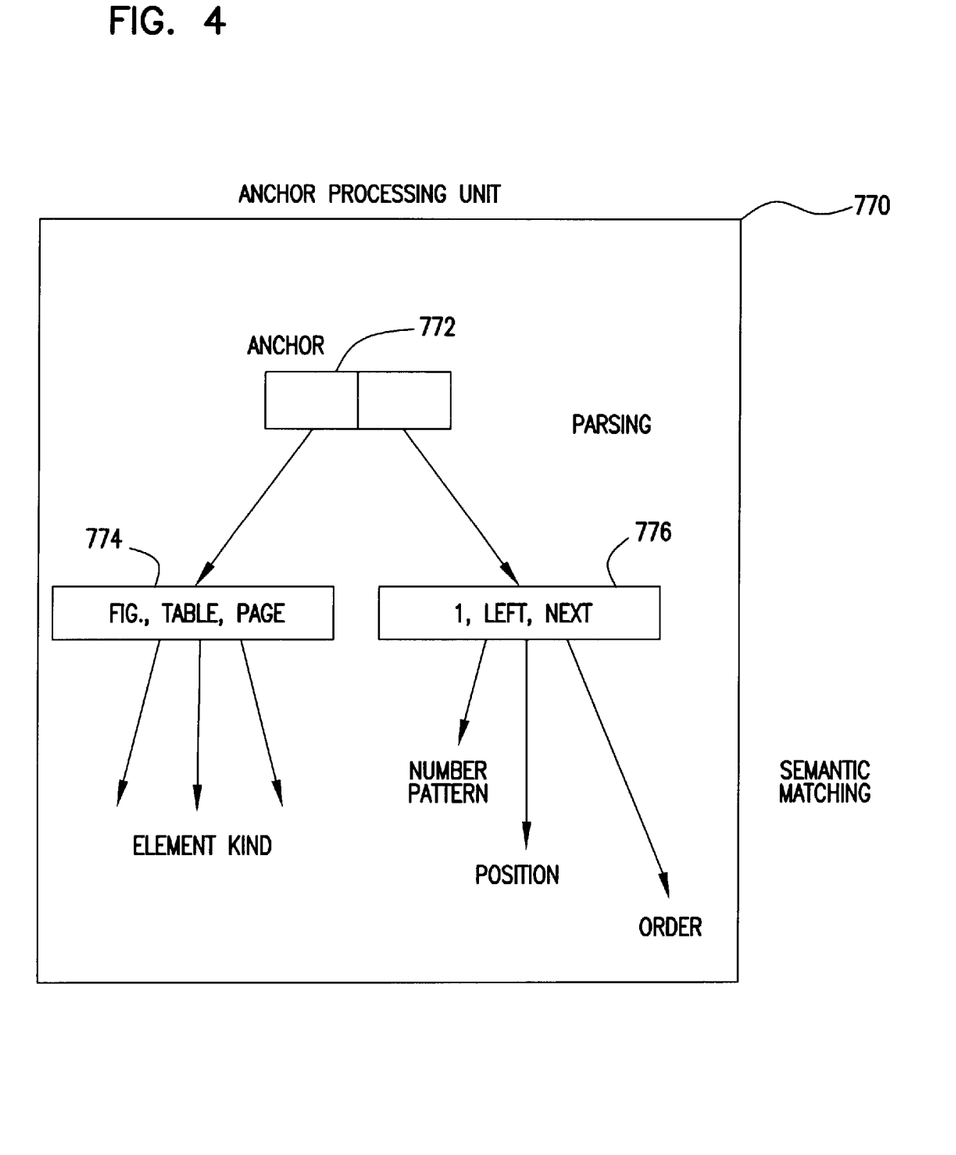
FIG. 4 is a diagram illustrating detail elements of an anchor processing unit in the preferred embodiment according to the current invention.

Referring to FIG. 4, the above described anchor processing unit 770 further includes an anchor 772 which in turn comprises anchor components 774 and 776. The first anchor component 774 is a key portion and specifies a type or kind of an element such as Fig, Table, Page, Diagram and etc. On the other hand, the second anchor component 776 is a reference portion for indicating a reference numeral for the element specified by the key portion. For example, an anchor, "FIG. 1" has a key portion, "FIG. " and a reference portion, "1." Thus, text data is independently matched with anchor components, and the anchor provides flexibility in specifying elements. To further illustrate the flexibility, an anchor "Fig. *" has a reference portion, "*" which refers to all elements that satisfy the reference portion. In other words, "Fig. *" refers to all figures.

Still referring to FIG. 4, the above described anchor processing unit 770 is also capable of processing a text portion which refers to a figure by a relative term such as "the above figure," "the below figure," "the right figure," and "the left figure." Even though there is not an associated legend nor a self-reference in the figure itself, the anchor processing unit 770 parses a relevant portion of the relative terms and matches a corresponding figure element based upon the layout analysis data which contains relative position information. For example, if the anchor specifies a "figure *," the anchor processing unit 770 parses the text element, "the below figure" and matches the text portion with a figure element located below the text portion based upon the layout analysis data.

Figure 5:
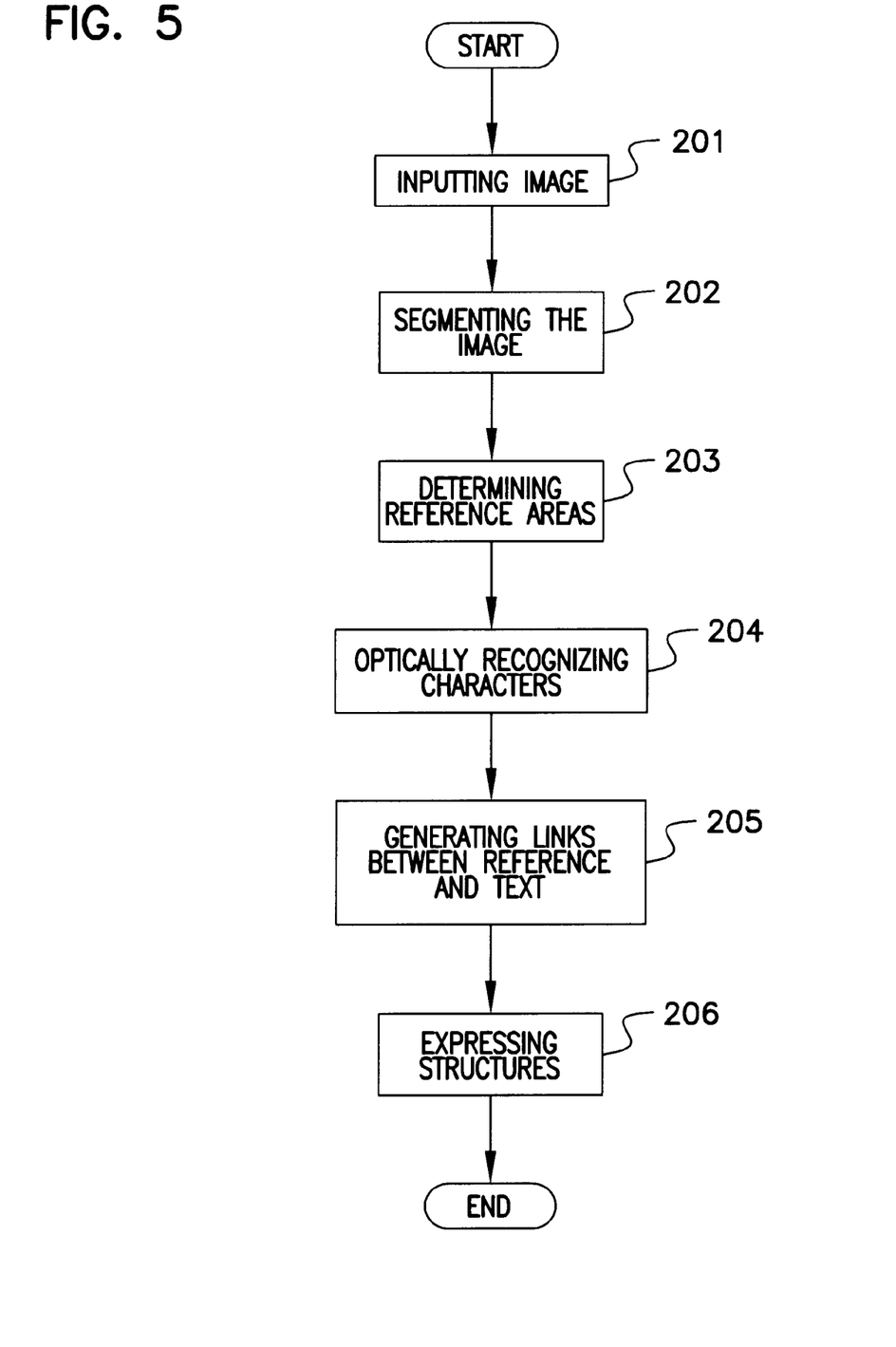
FIG. 5 is a flow chart illustrating steps automatically linking elements in one preferred process according to the current invention.

Now referring to FIG. 5, a flow chart illustrates steps of automatically linking elements in one preferred process according to the current invention. In a step 201, an input image is inputted from any source including a local storage unit and a communication network. The image is divided into segments in a step 202 according to prior art such as Japanese Patent Publication Hei 6-20092. The segments are generally circumscribing rectangles and classified as text, figure, table and etc. In each segment, a reference area is sought. The reference area includes a reference to an element. For example, a reference area is a text area referring to a figure such as "FIG. 1." Another reference area is a legend area referring to a figure. Yet another reference area is a graphical area containing a graphic image of "FIG. 1" for referring to itself in a figure element. After the reference areas are determined, characters or textual image is converted into character data via optical character recognition in a step 204. Based upon the character data and an anchor specifying desirable links, elements are linked in a step 205. The anchor information is user defined and is also selectable during each session. Furthermore, the anchor has anchor components including a key portion for specifying a type of an element as well as a reference portion for specifying a reference. Lastly, in a step 206, based upon the above generated links, the structural expressions or link results are outputted. Such results are expressed in a special programming language such as HTML.

Figure 6:
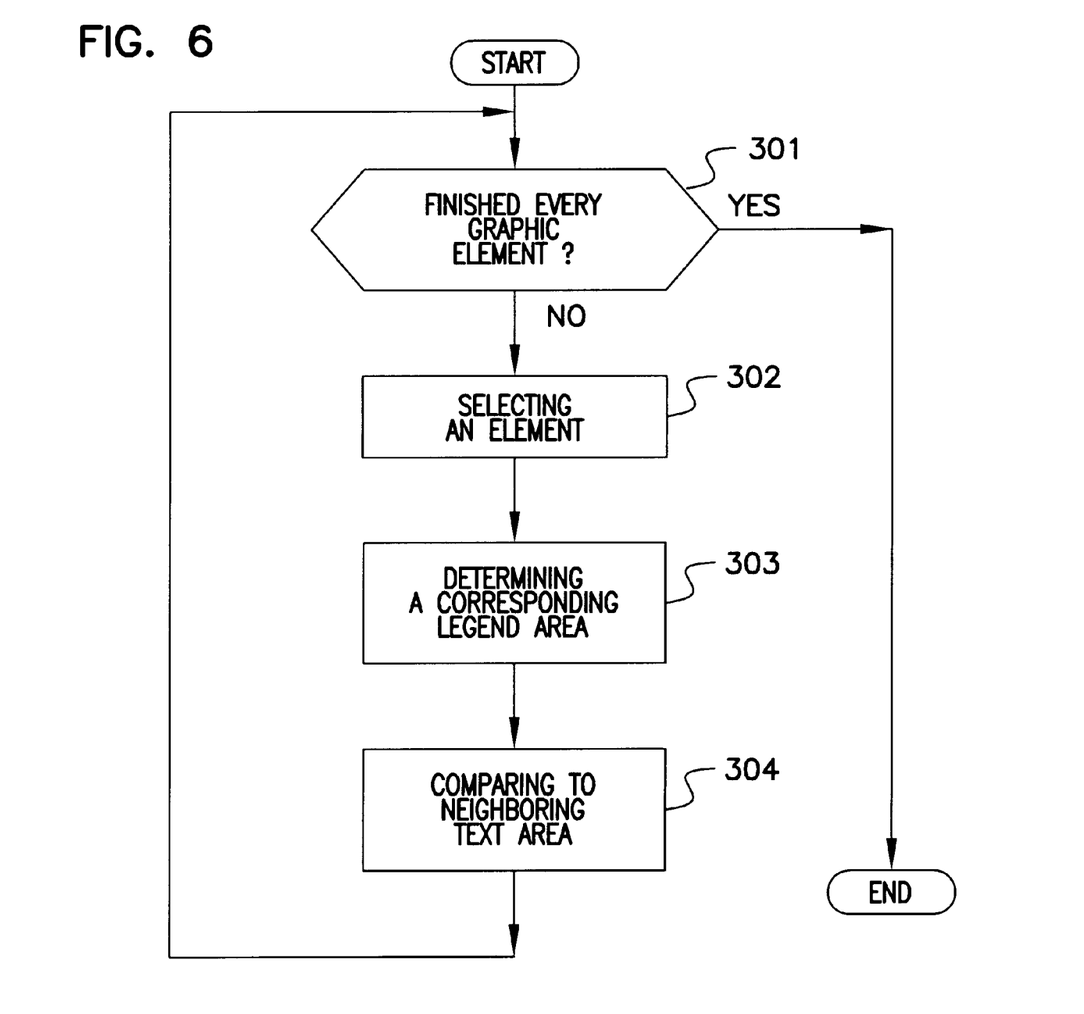
FIG. 6 is a flow chart illustrating steps of determining a reference area such as a legend area in one preferred process according to the current invention.

Now referring to FIG. 6, a flow chart illustrates steps of determining a reference area such as a legend area in one preferred process according to the current invention. In a step 301, it is determined whether every figure element has been examined. Upon finishing every element, the process ends. On the other hand, if there is an unexamined figure element, the figure element is selected in a step 302, and a candidate for the corresponding legend area is selected in a step 303. The legend area generally contains textual information for describing the corresponding figure. A relevant part of the textual information is converted into character data as described above in reference to FIG. 5. Lastly, in a step 304, the candidate is confirmed for its validity as an associated legend based upon a predetermined set of criteria such as a distance to a neighboring textual element.

Figure 7:
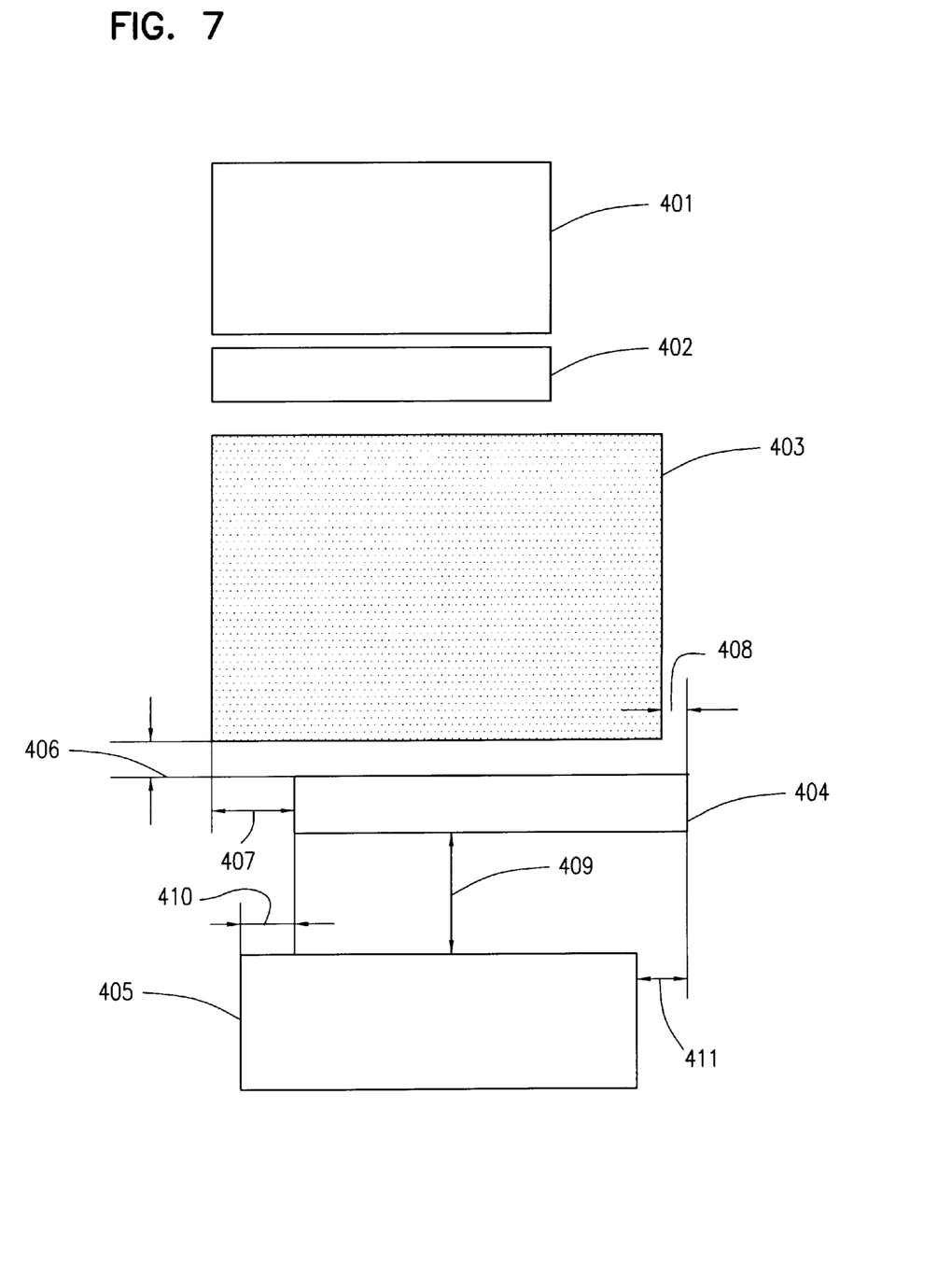
FIG. 7 is an example of segmented areas in an text image.

To illustrate the steps of determining a legend area, referring to FIG. 7, a textual image is shown. Areas 401, 402, 404 and 405 are each textual image while an area 403 is a figure image. A vertical distance 406 as indicated by a pair of opposing arrows between the areas 403 and 404 is used as one of the predetermined criteria for determining whether the 404 is a legend for the area 403. By the same token, another vertical distance 409 as indicated by an arrow is a distance to a neighboring text area and is also used as another of the predetermined criteria for determining whether the 404 is a legend. Lastly, two horizontal distances 407 and 411 are respectively an indentation and an overrun of the area 404 from the area 403. These horizontal alignments are also used as a part of the predetermined criteria.

Figure 8:
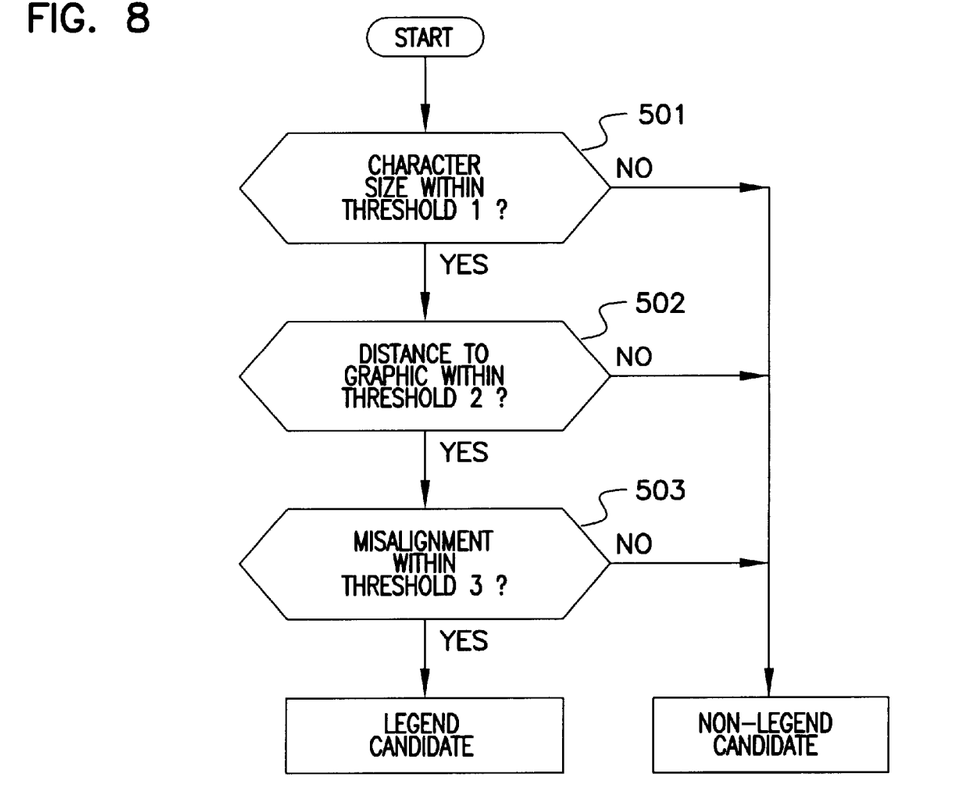
FIG. 8 is a flow chart illustrating detailed steps involved in determining a legend.

Now referring to FIG. 8, the above described legend determining step 303 of FIG. 6 is more fully illustrated in a flow chart. To determine whether a selected area is a legend, a set of predetermined criteria is examined. In a step 501, it is found whether or not the absolute height of the selected area or the character size is within a predetermined first threshold value. In the alternative, in the step 501, it is checked whether or not a ratio such as one between the character size of the selected area and an average character size of the page is within the predetermined first threshold value. Another criterion is to determine in a step 502 whether or not a distance between the selected area and a figure area such as a distance 406 as shown in FIG. 7 is within a predetermined second threshold value. Lastly in a step 503, it is determined whether or not a misalignment distance such as the indentation 407 and the overrun 408 as shown in FIG. 7 is within a predetermined third threshold value. Based upon the above described exemplary criteria, it is determined whether or not the selected area is a legend.

Figure 9:
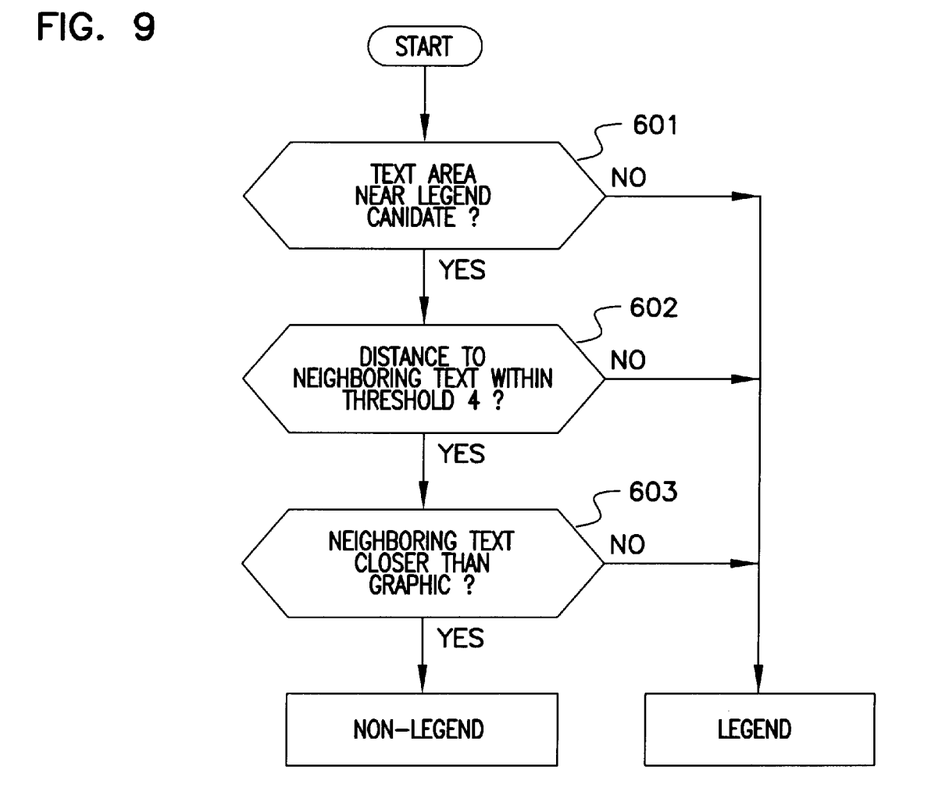
FIG. 9 is a flow chart illustrating another set of detailed steps involved in determining a legend.

Now referring to FIG. 9, the above described legend determining step 304 of FIG. 6 is more fully illustrated in a flow chart. To determine whether a selected area is a legend, an additional set of predetermined criteria is further examined. In a step 601, it is found whether or not there is a textual area near the selected area. Another criterion is to determine in a step 602 whether or not a distance between the selected area and a distance to a neighboring textual area within a predetermined fourth threshold value. Lastly in a step 603, it is determined whether or not the selected area is located closer to a neighboring textual area than a figure area. Based upon the above described exemplary criteria, it is determined whether or not the selected area is a legend area. Once the legend area is determined, the figure area is generally considered as an associated figure element.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the term in which the appended claims are expressed.

What is claimed is:

1. A method of generating a link in an image, comprising the steps of:
    a) inputting the image containing segments;
    b) dividing the image into segments, said segments containing at least one figure portion and at least one text portion, said figure portion and said text portion further containing a reference area;
    c) determining said reference area among said segments by selecting reference candidates for said reference area and comparing each of said reference candidates to said figure portion of the image;
    d) recognizing characters in the image including said reference area; and
    e) generating a link between said reference area of said figure portion and a corresponding one of said text portion based upon said characters.

2. The method of generating a link in an image according to claim 1 wherein said step g) further comprises steps of:

h) determining whether a size of said reference candidates is within a predetermined font size;

i) determining whether a distance between each of said reference candidates and said figure portion is within a predetermined distance; and   j) determining whether an amount of misalignment of said figure portion is within a predetermined error amount.

3. The method of generating a link in an image according to claim 1 wherein said step g) further comprises steps of:

k) determining whether each of said reference candidates is near a text portion;

l) determining whether a distance between each of said text portions and said figure portion is within a predetermined distance; and   m) said selecting one of said reference candidates that is closer to said text portion than figure portion.

4. The method of generating a link in an image according to claim 1 wherein the figure portion includes a figure, a graph, an equation and a table.

5. A system for generating a link in an image between a figure portion and a corresponding text portion, comprising:

an inputting unit for inputting the image;

a segmentation unit connected to said inputting unit for dividing the image into segments, said segments containing at least one figure portion and at least one text portion, said figure portion and said text portion further containing a reference area;

a reference area determination unit connected to said segmentation unit for determining said reference area among said segments, said reference area determination unit further selecting reference candidates for said reference area and comparing each of said reference candidates to said figure portion of the image;

a character recognition unit connected to said inputting unit for recognizing characters in the image including said reference area; and   a link generation unit connected to said reference area determination unit and said character recognition unit for generating a link between said reference area of said figure portion and a corresponding one of said text portion based upon said characters.

6. The system for generating a link in an image according to claim 5 wherein said reference area determination unit determines whether a size of said reference candidates is within a predetermined font size.

7. The system for generating a link in an image according to claim 5 wherein said reference area determination unit determines whether a distance between each of said reference candidates and said figure portion is within a predetermined distance.

8. The system for generating a link in an image according to claim 5 wherein said reference area determination unit determines whether an amount of misalignment of said figure portion is within a predetermined error amount.

9. The system for generating a link in an image according to claim 5 wherein said reference area determination unit determines whether each of said reference candidates is near a text portion.

10. The system for generating a link in an image according to claim 9 wherein said reference area determination unit determines selects one of said reference candidates that is closer to said text portion than said figure portion.

11. The system for generating a link in an image according to claim 5 wherein the figure portion includes a figure, a graph, an equation and a table.

\* \* \* \* \*